United States Patent [19] [11] 4,389,105
Kitai et al. [45] Jun. 21, 1983

[54] DEVICE FOR DETECTING COINCIDENT FOCUSING POINTS

[75] Inventors: Kiyoshi Kitai; Takeo Saito; Takashi Segawa; Yoichi Seki, all of Shikawatashi, Japan

[73] Assignee: Seiko Koki Kabushiki Kaisha, Tokyo, Japan

[21] Appl. No.: 961,742

[22] Filed: Nov. 17, 1978

[30] Foreign Application Priority Data

Nov. 18, 1977 [JP] Japan ............................ 52-138740

[51] Int. Cl.³ .......................................... G03B 3/10
[52] U.S. Cl. .................................................. 354/25
[58] Field of Search ................. 354/23 D, 25, 31, 24; 352/140; 355/56

[56] References Cited

U.S. PATENT DOCUMENTS 4,085,320 4/1978 Wilwerding ...................... 354/25 X Primary Examiner—Michael L. Gellner
Attorney, Agent, or Firm—Robert E. Burns; Emmanuel J. Lobato; Bruce L. Adams

[57] ABSTRACT

A device for detecting coincident focusing points for use in the controlling of the focusing of an automatically focusable lens comprises a single array of light receiving transducers for converting the distribution of light intensity of an image applied thereon to a set of corresponding electrical signals. The image applied to the array is from a first optical path from an object through the lens and from a second optical path from the object. At least one shutter is provided for cutting off one of the optical paths to alternatively effect the application of light from the one optical path on to the array to produce a first set of signals and thereafter the light from either the other optical path or the sum of the two optical paths on to the array to produce a second set of signals. The first set of signals are processed to produce a third set of signals which correspond to the ratio of each signal therein with respect to another of the signals and the second set of signals is processed to obtain a fourth set of signals corresponding to the ratio of each signal with respect to another of the signals. The third and fourth sets of signals, for each transducer, are compared and a signal is produced when a favorable comparison is obtained.

7 Claims, 5 Drawing Figures

DEVICE FOR DETECTING COINCIDENT FOCUSING POINTS

BACKGROUND OF THE INVENTION

This invention relates to a device for detecting coincident focusing points and more particularly to a device for detecting coincident focusing points for recording an image of the object.

In a conventional detecting device of this type, it is well known to employ a system for detecting the coincidence of dual images, wherein two optical paths are provided, one of them being a fixed optical path, and the other being a movable light path in which information on the distribution of intensity of light may be changed. Each of the incoming light begins from the two light paths is received by two light receiving devices comprised of a plurality of light receiving elements, and a coincidence of focusing points is made when the distributions of light intensity in the two light receiving devices are coincident. As a method for detecting the time when the distributions of light intensity are coincident with each other the difference between the two light receiving devices is calculated to provide a point showing that all the calculated values become zero. However, in a practical example, due to a difference in sensitivity between each of the elements and a difference in efficiencies in the light path, it is a rare situation that all the difference values become zero. Thus, it was proposed to use a method in which the sum of the absolute values of differences between the outputs of each of the corresponding elements becomes a minimum value. In order to get a minimum value in accordance with this method, the movable incoming light is scanned over the full operating range and thereby it is required to determine the minimum value. The minimum value may be varied in reference to a level of light intensity at the circumference of the object to be photographed and thus it is not possible to get a minimum value by the coincidence of a specified value. It is essential to provide the scanning over the entire operating range. Even if such a scanning is performed, an accuracy is also restricted due to a difference in sensitivities of each of the elements and a difference in the light paths.

On the other hand, as a method for decreasing the influence of the level in the intensity of light at the circumference of the object to be photographed, it has been proposed to get the minimum value by a ratio on the basis of the principle in which a ratio of the outputs between the corresponding elements of the two light receiving devices equals to 1 resulting in a coincident focusing point. Since this proposed method may utilize a ratio between the light receiving devices, there still remains such effects as a difference between the sensitivities of each of the elements and a difference of efficiencies in the light paths.

SUMMARY OF THE INVENTION

In the present invention, in order to accommodate these conventional disadvantages, a single light receiving device is utilized for detecting a coincidence of the focusing points in an accurate manner without having such effects as the difference in sensitivities between the elements and the difference in efficiency in the optical path, wherein a first optical path is cut off in a first step, the output of each of the elements corresponding to a distribution of intensity of light in the second light path is stored, the first and second light paths are cut off in a second step, the output of each of the elements corresponding to a distribution of intensity of light of only the incoming light in the first optical path is calculated and the result of the calculation is made as to the similarity to the distribution stored in the first step. As a practical example, since the comparison is made for the ratio between the outputs of any elements in place of applying the output itself of the elements in the first and second steps, a time when the ratios of each of the elements are coincident with each other is such a time as a dual image coincident point is made. Even if the sensitivities are different between the elements and the efficiency is different in reference to the optical path, a comparison by the ratio will eliminate the causes of variation and enables a provision of the output corresponding to the distribution of intensity of light.

DETAILED DESCRIPTION OF THE INVENTION

Figure 1:
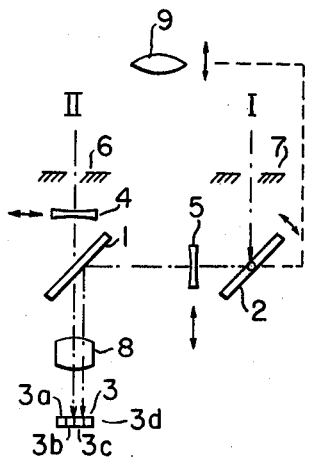
FIGS. 1 to 3 illustrate a condition of an optical system and an arrangement of a light receiving device of a preferred embodiment of the present invention.
Figure 2:
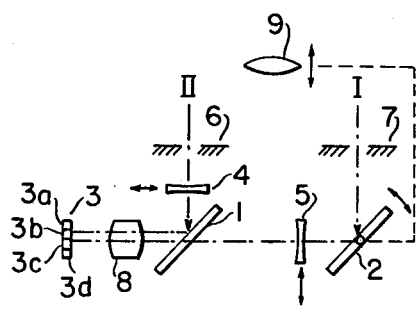
Figure 3:
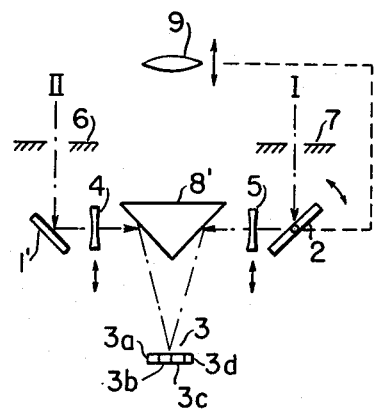
Figure 4:
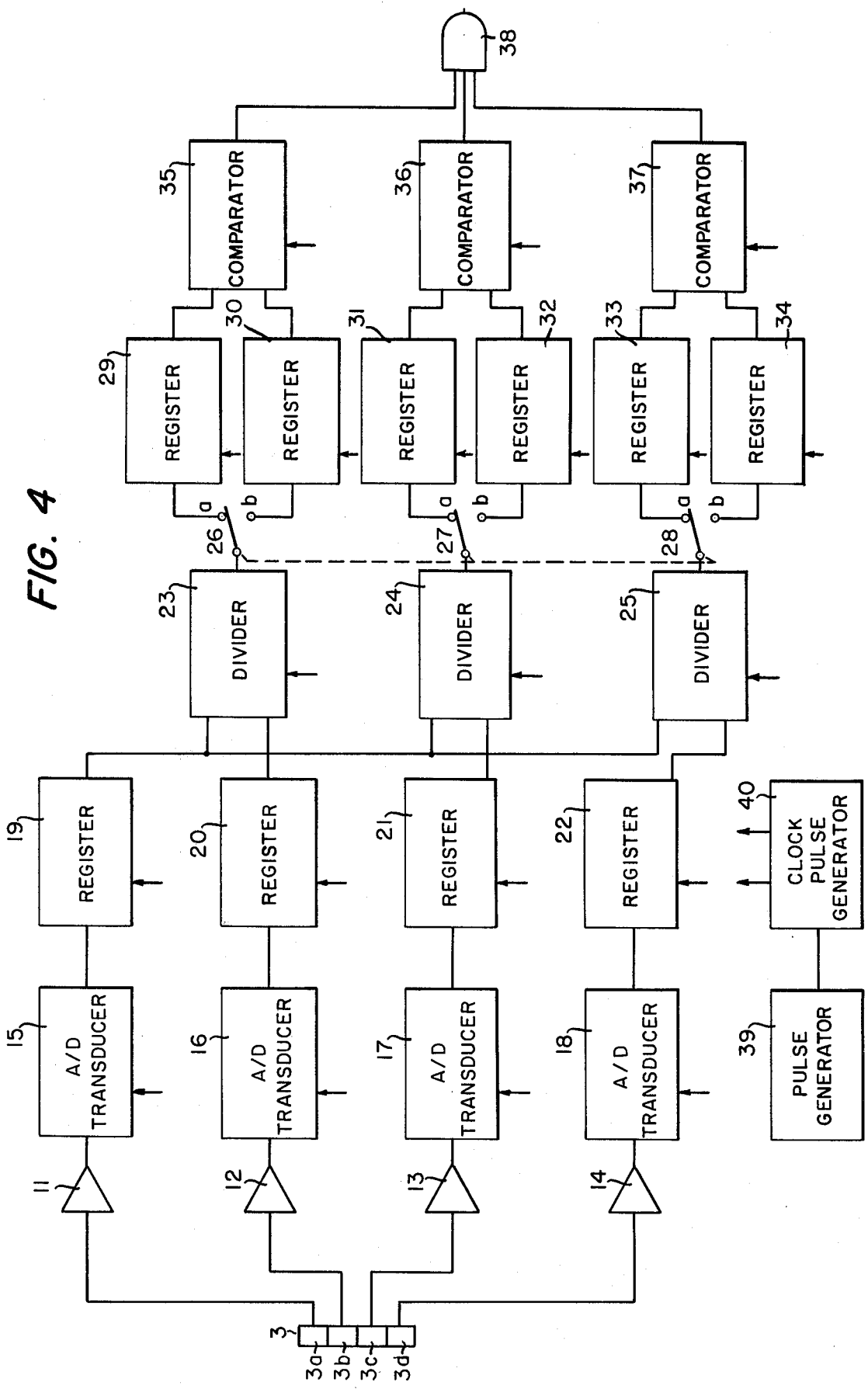
FIG. 4 is a block diagram showing a circuit for detecting a coincidence of focusing points from the output of a light receiving device of the preferred embodiment shown in FIGS. 1 to 3.
Figure 5:
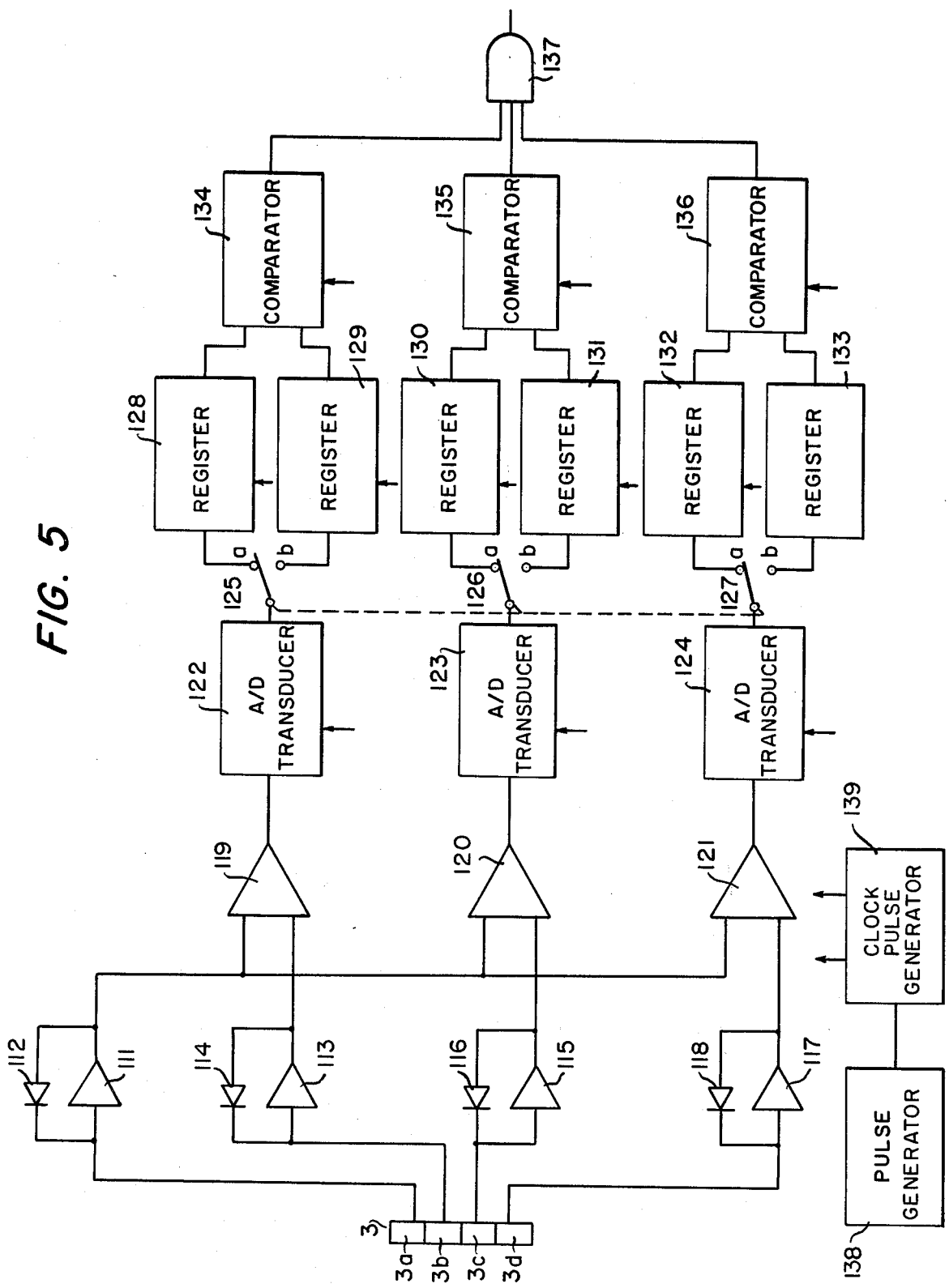
FIG. 5 shows a block diagram of a circuit of another preferred embodiment.

Referring now to the drawings, a preferred embodiment of the present invention will be described below wherein FIGS. 1 to 3 show the constituents of an optical system and an arrangement of a light receiving device of a preferred embodiment of the present invention. FIG. 4 is a block diagram for a circuit for detecting a coincidence of focusing points from the output of the light receiving device in reference to the embodiment shown in FIGS. 1 to 3. FIG. 5 indicates a block diagram of a circuit of another embodiment.

In FIG. 1, the reference numeral 1 indicates a fixed half mirror for reflecting incoming light I in a first light path which will pass incoming light II in a second light path, the reference numeral 2 is a mirror for reflecting the incoming light I in the first light path and which is rotatable in cooperation with an objective lens 9 for use in photography. Reference numeral 3 indicates a light receiving device comprised of light receiving elements 3a, 3b, 3c and 3d. However, the number of the light receiving elements is not restricted to four, but a plurality of any number of the light receiving elements may be provided. Reference numeral 4 shows a shutter for cutting off the incoming light II in the second light path, reference numeral 5 indicates a shutter for cutting off the incoming light in the first light path, reference numerals 6 and 7 illustrate the openings for restricting each of the light paths and reference numeral 8 shows a lens for concentrating the incoming lights from both light paths onto the light receiving device 3.

An arrangement shown in FIG. 2 is substantially the same as that of FIG. 1, but some difference may be found in the fact that the incoming light II in the second light path is reflected by the half mirror 1 and the incoming light I in the first light path passes through the half mirror 1 and concentrates onto the light receiving device 3.

In a preferred embodiment shown in FIG. 3, a fixed mirror 1' is arranged in place of the half mirror 1, a prism 8' is provided in place of a lens 8. Both the incoming light I in the first light path and the incoming light II in the second light path are guided to the light receiving device 3 by a reflection from the prism 8'.

The operation of the arrangement shown in FIGS. 1 to 3 will be described. In FIG. 1, the incoming light II in the second light path will pass through the half mirror 1 by opening the shutter 4 in the second light path in a first step in which the incoming light I in the first light path is shut off by closing the shutter 5, and further the incoming light II will pass through the lens 8 up to the light receiving device 3 and then generate the outputs at each of the light receiving elements 3a to 3d corresponding to the distribution of the strength of the light. The outputs are stored in a memory circuit. Then, in the second step, the shutter 4 is closed and thus made to cut off the second light path and the shutter 5 is opened and is thus taken out of the light path, so that the incoming light I in the first light path is reflected by the half mirror 1, passes through the lens 8, reaches the light receiving device 3 and thus it is possible to provide the output corresponding to the distribution of the intensity of the light. In the second step, even if the first incoming light I and the second incoming light II are guided simultaneously to the light receiving device without closing the shutter 4, a process for providing a treatment of the ratio of the outputs of each of the elements of the present invention may provide the same treatment as that described above, due to the fact that a distribution of the intensity of light of a sum of I and II will produce a similarity distribution in the case of a coincidence of the focusing points. Due to this fact, it is possible to eliminate the shutter 4. And, in place of cutting off the light by the shutter 5 in the first step, a similar effect may be provided if the angle of the mirror 2 is set out of the radiation range of the light receiving elements and thus it is possible to eliminate the shutter 5.

In FIG. 4, the reference numerals 11 to 14 indicate the amplifiers for use in amplifying the output from each of the light receiving elements, reference numerals 15 to 18 show A/D converters or transducers, reference numerals 19 to 22 indicate a register for use in performing a calculation, reference numerals 23 to 25 represent a divider, reference numerals 26 to 28 indicate signal change-over means, reference numerals 29 to 34 indicate a register, reference numerals 35 to 37 show a comparator, reference numeral 38 represents and AND circuit, reference numeral 39 indicates a pulse generator and reference numeral 40 indicates a clock pulse generating circuit.

The operation of the circuit shown in FIG. 4 is performed such that in the first step, the outputs $A_1$ to $A_4$ of each of the light receiving elements 3a to 3d corresponding to a distribution of intensity of light of the incoming light II in the second light path are amplified by the amplifiers 11 to 14 and transformed to their digital value by A/D transducers 15 to 18, respectively, and then transmitted to each of the registers 19 to 22. The values of $A_2/A_1$, $A_3/A_1$, $A_4/A_1$ are calculated by the dividers 23 to 25, respectively.

The present invention is not restricted to a ratio of the other elements with respect to a specified element and the ratio between any elements may be calculated, and further the ratio against that of $A_1$ is described as an example. The values of $A_2/A_1$, $A_3/A_1$ and $A_4/A_1$ provided as a result of calculation are stored in each of the registers 29, 31 and 33 after the change-over means 26 to 28 are set to a. Then in the second step, either the incoming light I in the first light path or the incoming light in the first and second light paths simultaneously is guided to the light receiving elements 3a to 3d, and the values of $B_2/B_1$, $B_3/B_1$ and $B_4/B_1$ may be provided as the outputs of the dividers 23 to 25 from the outputs $B_1$ to $B_4$ of each of the elements in the same manner as that of the first step. In the second step, the change-over means 26 to 28 are already set to b, each of the outputs is fed to the registers 30, 32 and 34. The contents of the registers 30, 32 and 34 and the contents stored in the registers 29, 31 and 33 from the first stage are compared in the comparators 35 to 37 and when all of the contents are the same value, a coincident signal is produced by AND circuit 38. On the contrary, when either one of the outputs does not coincide, information is fed to the light receiving device by the changing of the angle of the movable mirror 2, and the result of the calculation is fed to the registers 30, 32 and 34 and the condition for enabling the production of the coincident signal is traced by comparing the stored contents in sequence. The angle of the movable mirror 2, when the coincidence signal is produced, is replaced by the position of the object lens 9 and results in the condition of the coincident focusing point. Each of the circuit blocks may be operated with reference to the timing of the clock pulse fed out from the clock pulse generator 40 by the output from the pulse generator 39. is condition is indicated by the arrows shown in each of the circuit blocks. If the number of bits of two digital inputs to be compared in the comparators 35 to 37 is set to the value sufficient to provide a practical operation, it is not necessary to increase the resolution and further, since this is a digital comparison, it is possible to obtain the condition of complete coincidence.

The present invnetion is not restricted to the arrangement shown in FIG. 4 and the timing of A/D transforamtion may be provided after the division calculation, and the final comparison may be performed by an analog scale on occasion. If a proper arrangement may be made in reference to a condition of the practical circuit, it is apparent that the features of the present invention may not be destroyed.

Referring now to FIG. 5 showing another embodiment, reference numerals 111, 113, 115 and 117 are the amplifiers for amplifying the outputs of the elements 3a to 3d, reference numerals 112, 114, 116 and 118 indicate diodes for converting the inputs of the amplifier to its logarithm at the outputs of the amplifiers, reference numerals 119 to 121 indicate differential amplifiers, reference numerals 122 to 124 show A/D transducers, reference numerals 125 to 127 indicate signal change-over means, reference numerals 128 to 133 show a register, reference numerals 134 to 136 indicate a comparator circuit, reference numeral 137 is an AND circuit, reference numeral 138 represents pulse generator and reference numeral 139 indicates a clock pulse generator.

The operation of the circuit shown in FIG. 5 is performed such that in the first step, the outputs $A_1$ to $A_4$ of each of the light receiving elements 3a to 3d corresponding to a distribution of intensity of light of the incoming light II of the second light path are converted to their logarithmic values at the output of the amplifiers and thus log $A_1$ to log $A_4$ are obtained. In order to calculate the ratio of output of other elements against a value of $A_1$, the differential amplifiers 119 to 121 are utilized to calculate the values of log $A_2$ − log $A_1$, log $A_3 - \log A_1$ and $\log A_4 - \log A_1$. This is actually a calculation of log log and log and in other words it is a calculation of a value corresponding to the ratio. The value calculated in such a manner is transformed to a digital value by A/D transducers 122 to 124 and the change-over means 125 to 127 are connected to a in the first step and then stored in the registers 128, 130 and 132. Then in the secont step, either the incoming light I or the sum of the incoming light I and II in the first and second light paths is fed to the light receiving device 3, the outputs $B_1$ to $B_4$ are calculated in the same manner as that of the first step and the values of the outputs of $\log B_2 - \log B_1$, $\log B_3 - \log B_1$ and $\log B_4 - \log B_1$ are obtained and changed to a digital value, then fed to the registers 129, 131 and 133 by the change-over means, and compared in comparators 134–136 with each of the contents stored in the registers 128, 130 and 132 in the first step. When all of the contents are coincident with each other, the coincidence signal is fed out from AND circuit 137. The operation until the coincidence signal is fed out is quite the same as that of FIG. 4 and it is apparent that the timing of A/D transformation is not restricted to that of FIG. 4.

From the foregoing description, the operation in the device of the present invention has become apparent and there will now be described the reason why the present device is not affected by the difference in sensitivities between the elements of the present invention and the difference in efficiencies in the light paths.

In FIG. 1, when the sensitivity against the intensity of light for each of the elements are $k_a$, $k_b$, $k_o$ and $k_d$, a rate of reflection of the mirror 2 against the incoming light $E_a, E_b, E_o$ and $E_d$ from the first light path is $\gamma(\gamma \leq 1)$, and a rate of reflection of the half mirror 1 is $\beta(\beta<1)$, the outputs $B_1$ to $B_4$ of each of the elements are as follows.

$$B_1 = E_a \cdot \gamma \cdot \beta \cdot k_a \quad B_2 = E_b \cdot \gamma \cdot \beta \cdot k_b$$

$$B_3 = E_o \cdot \gamma \cdot \beta \cdot k_o \quad B_4 = E_d \cdot \gamma \cdot \beta \cdot k_d$$

The ratio of each of the outputs against the value of $B_1$ is as follows:

$$B_2/B_1 = \frac{E_b \cdot k_b}{E_a \cdot k_a} \quad B_3/B_1 = \frac{E_o \cdot k_o}{E_a \cdot k_a} \quad B_4/B_1 = \frac{E_d \cdot k_d}{E_a \cdot k_a}$$

When the rate of transmittance of the half mirror 1 against the incoming light $E_a'$, $E_b'$, $E_o'$ and $E_d'$ from the second light path is $\alpha(\alpha<1)$, the outputs $A_1$ to $A_4$ of each of the elements are as follows.

$$A_1 = E'_a \cdot \alpha \cdot k_a \quad A_2 = E'_b \cdot \alpha \cdot k_b$$

$$A_3 = E'_o \cdot \alpha \cdot k_o \quad A_4 = E'_d \cdot \alpha \cdot k_d$$

The ratio of each of the outputs against $A_1$ is calculated as follows:

$$A_2/A_1 = \frac{E'_b \cdot k_b}{E'_a \cdot k_a}, \quad A_3/A_1 = \frac{E'_o \cdot k_o}{E'_a \cdot k_o}, \quad A_4/A_1 = \frac{E'_d \cdot k_d}{E'_a \cdot k_a}$$

It is in the case of $E_b/E_a = E_b'/E_a'$ that the equation of $A_2/A_1 = B_2/B_1$ is established. Similarly, it is in the case of the coincidence of all the equations when the equations $E_o/E_a = E_o'/E_a'$, $E_d/E_a = E_d'/E_a'$ are established.

That is, the fact that the ratios between the outputs of each of the elements are the same shown that a distribution of the intensity of light of the incoming light is made in a similarity relation irrespective of a sensitivity of each of the elements and different efficiencies in the light paths. In practical operation, in view of the fact that it is a rare possibility to feed information of a distribution of similar intensity of light quite the same as that near the object to be photographed, it may be considered as providing no practical problem to have a coincidence of the ratio of the distribution of intensity of light, i.e. to have the coincidence when the focusing points coincide with each other. During the above described calculation, the loss in the optical system has been restricted to the mirror, since the rate of loss is always kept constant even if any loss is found in the light path, thus it is apparent that the loss may be ignored if the ratio is calculated.

Thus, in accordance with the method of the present invention, the influence from the light receiving element or the light may be ignored and further the difference in sensitivities of the input amplifier in the circuit or disturbance in characteristics of the logarithm conversion diodes may be ignored since the same circuit is utilized in the first step and the second step.

On the other hand, in the second step, even if the incoming light I of the first light path and the incoming light of the second light path are simultaneously utilized, since the incoming light I and II are in a similarity relation when the focusing points are in a similarity relation when the focusing points are coincident with each other, a sum of the incoming light I and II will show the same similarity distribution and a condition of coincidence of the focusing points may be detected in a similar process.

As has been described, since the present invention will compare the incoming light by using the same light receiving device after change-over thereof and further compares by applying a ratio of outputs between each of the elements and the arrangement and the manufacturing of the light receiving elements are simple and it is possible to ignore the difference in sensitivities between each of the elements and the difference in efficiency of the light path and further the elements are not affected by a disturbance in the characteristics of the elements in the circuits and the temperature or voltage, the practical effect is achieved of an extremely high merit with respect to cost.

What is claimed is:

1. Device for detecting coincident focusing points of two different light paths, comprising: a plurality of light receiving elements forming a single array for receiving light incoming from the two different light paths to produce sets of signals $A_1 \ldots A_n$ and $B_1 \ldots B_n$, means for cutting off the first light path so that the incoming light of the second light path is received by said light receiving elements, means for forming the ratio between the output signals $A_1 \ldots A_n$ of each of the elements with respect to another of signals $A_1 \ldots A_n$ and for storing same, means for thereafter applying the incoming light in said first light path and said second light path simultaneously or the incoming light in the first light path to said light receiving elements, means for forming the ratio between the output signals $B_1, \ldots B_n$ of each of the elements with respect to another of signals $B_1 \ldots B_n$, means for comparing the ratios with the stored ratios and for producing a signal when the ratio between the similar elements are coincident with each other.

2. Device for detecting coincident focusing points as set forth in claim 1 wherein the means for forming the ratio includes means for converting each of the photoelectric outputs $A_1, \ldots A_n, B_1, \ldots B_n$ to logarithmic form and thereafter forming a difference with the logarithmic value of another of the signal outputs.

3. Device for detecting coincident focusing points as set forth in claim 1 further comprising means for converting the outputs to digital values and wherein a digital comparison is made at least when the final comparison is performed.

4. Device for detecting coincident focusing points as set forth in claim 1 wherein the ratios between the outputs $A_1 \ldots A_n$ and $B_1 \ldots B_n$ are formed with a single output $A_k$, $B_k$ respectively.

5. A device for controlling the focusing of an automatically focusable lens, the device comprising: a single array of light receiving transducers for converting the distribution of light intensity of an image applied thereto to a set of corresponding electrical signals; means forming a first optical path from an object through the lens and to the array; means forming a second optical path from the object and to the array; means for alternatively cutting off at least one of the optical paths to alternately effect the application of firstly the light from one optical path on the array to produce a first set of signals and secondly the light from the other optical path or the sum of the two optical paths on the array to produce a second set of signals; means for processing the first set of signals produced during the first application of light to obtain a third set of signals corresponding to the ratio of each signal of the associated first set of signals with respect to another of the signals and for processing the second set of signals produced during the second application to obtain a fourth set of signals corresponding to the ratio of each signal of the third set of signals with respect to another of the signals; and means for comparing the third and fourth sets of signals for each transducer and for producing a signal when a favorable comparison is obtained.

6. The drive according to claim 5, wherein the means for processing comprises an analog to digital converter for each signal in the set of signals, a register for temporarily storing the outputs of the analog to digital converters, a plurality of divider circuits for dividing the output of each register with the output from one register, two sets of parallel registers and switch means for directing the output of the divider to one of the sets of two parallel registers during the first application to store the third set of signals and to the other set of parallel registers during the second application to store the fourth set of signals.

7. The device according to claim 5, wherein the means for processing comprises a logarithmic converter for each signal in the set of signals, a plurality of difference circuits for subtracting the output of one logarithmic converter from the outputs of the other logarithmic converters, analog to digital converters following the outputs of the difference circuits, two sets of parallel registers and switchover means for directing the outputs of the analog to digital converters to one set of parallel registers for the first application to store the third set of signals and for directing the outputs of the analog to digital converters to the other set of parallel registers for the second application to store the fourth set of signals.

* * * * *